United States Patent
Li

(10) Patent No.: US 8,783,498 B2
(45) Date of Patent: Jul. 22, 2014

(54) SLOW COOKER WITH FASTENING MECHANISM

(71) Applicant: Zhanjiang New Nanfang Electrical Appliance Co., Ltd., Zhanjiang (CN)

(72) Inventor: Hui Li, Zhanjiang (CN)

(73) Assignee: Zhanjiang New Nanfang Electrical Appliance Co., Ltd., Zhanjiang, Guangdong Province (CN)

(*) Notice: Subject to any disclaimer, the term of this patent is extended or adjusted under 35 U.S.C. 154(b) by 0 days.

(21) Appl. No.: 13/792,724

(22) Filed: Mar. 11, 2013

(65) Prior Publication Data

US 2014/0103050 A1    Apr. 17, 2014

(30) Foreign Application Priority Data

Oct. 12, 2012    (CN) ...................... 2012 2 0524219 U

(51) Int. Cl.
*B65D 45/28* (2006.01)

(52) U.S. Cl.
USPC ........................................ 220/314; 220/323

(58) Field of Classification Search
USPC .......... 220/314, 318, 323, 324, 326; 219/432, 219/433; 292/256, 256.6, 341.15, DIG. 11, 292/DIG. 37
See application file for complete search history.

(56) References Cited

U.S. PATENT DOCUMENTS

| | | | | |
|---|---|---|---|---|
| 4,185,752 A * | 1/1980 | Basile | ........................... | 220/314 |
| 4,467,936 A * | 8/1984 | Makhijani | ..................... | 220/246 |
| 6,513,420 B1 * | 2/2003 | Park | ............................... | 99/337 |
| 8,230,779 B2 * | 7/2012 | Yang | .............................. | 99/403 |
| 2012/0199591 A1 * | 8/2012 | Stellwag | .................... | 220/573.1 |
| 2013/0306638 A1 * | 11/2013 | Ye et al. | ....................... | 220/318 |

FOREIGN PATENT DOCUMENTS

| | | |
|---|---|---|
| CN | 20219841 U | 4/2012 |
| CN | 202355168 U | 8/2012 |
| CN | 102764066 A | 11/2012 |

* cited by examiner

*Primary Examiner* — Anthony Stashick
*Assistant Examiner* — Jennifer N Zettl
(74) *Attorney, Agent, or Firm* — Robert P. Michal; Lucas & Mercanti, LLP

(57) ABSTRACT

A slow cooker with fastening mechanism includes a housing, handles on the side wall of the housing, and a lid, wherein a movable fastening mechanism is provided on the upper side of the lid, and each of the handles is hinged to a clamping hook and corresponds to the movable fastening mechanism, so that the clamping hook can interact with the movable fastening mechanism. The inner pot can be closed tightly by the action of the clamping hook. With two compressing parts provided on the clamping hook and the dismountable sealing ring around the lid rim, the inner pot can be closed tightly by the lid. The lid handle is fixed onto the lid via threaded connection with sealing plugs in the connection sites.

11 Claims, 11 Drawing Sheets

SLOW COOKER WITH FASTENING MECHANISM

CROSS REFERENCE TO RELATED APPLICATION

This Application claims the priority under 35 USC 119 of Chinese Patent Application No. 201220524219.8 filed on Oct. 12, 2012, which is incorporated herein by reference in its entirety.

FIELD OF TECHNOLOGY

The disclosure relates to cookers and, in particular, to slow cookers with fastening mechanism.

BACKGROUND

Slow cooker in the prior art is generally of simple design, and typically includes an inner pot and a lid thereon. Further, a fastening clip can be provided and hinged on a handle, such that the lid can be compressed tightly by clipping of the fastening clip. However, it is inconvenient to engage or release the fastening device. Besides, the sealing is not so perfect since the lid is compressed at one point only, which effects the quality of food cooked. On the other hand, a larger gap typically exists between the inner pot and the side wall, so that the inner pot cannot be placed steadily and protected well, and therefore it is not so safe when carrying the cooker. It is obviously significant to make further improvements to the design of the slow cooker for convenience and better cooking.

SUMMARY

For the purpose of overcoming the defects of the prior art, the present invention discloses a slow cooker with fastening mechanism, which is of novel and delicate configuration. A lid can be compressed tightly on the inner pot, while the clamping hook can be fastened and released quite easily and reliably.

According to the present invention, the slow cooker with fastening mechanism comprises a housing, housing handles disposed at the outer wall of the housing, and a lid, wherein a movable fastening mechanism is provided on the upper side of the lid, and the movable fastening mechanism comprises:

a first contractible rod and a second contractible rod, where a spring is provided between the opposite inner end of each contractible rod, wherein a slope inclining towards the inner end of the contractible rod is provided on the lower part of the inner end of each contractible rod;

an auxiliary connecting rod provided under the two contractible rods and fixed on the lid, where two wedges corresponding to two slopes are provided in the middle of the auxiliary connecting rod; wherein recess areas are respectively provided on two ends of the auxiliary connecting rod; wherein the outer ends of the two contractible rods cover the corresponding recess areas; and a button disposed above the contractible rods, with its bottom contacting with the top of the inner ends of the two contractible rods; wherein when the contractible rods are pressed down via the button to an utmost position, the horizontal distance between the outer ends of the two contractible rods is not greater than the horizontal distance between the two recess areas.

Each of the handles is hinged to a clamping hook and corresponds to the movable fastening mechanism, wherein the recess areas are located in the motion trail of the free end of each corresponding clamping hook, and a hole is provided on the free end part and corresponds to the outer end of each contractible rod.

In a preferred embodiment of the invention, two compressing parts are provided on each clamping hook, one of which is the free end part of the clamping hook, while the other one is the curve part for clamping the lid rim, the lid rim is fallen into the motion trail of the curve part.

In a preferred embodiment of the invention, each of the housing handles comprises a fixed block fixed on the outer wall of the housing and a U-shaped push block; A chamber with an upwards opening is provided on the fixed block, and a slot is provided on the outer side of the chamber along the radial direction of the housing; The U-shaped push block is provided in the slot and is able to slide horizontally, with a spring provided between its closed end and the inner side of the chamber, with its open end projecting from the slot; the clamping hook is hinged to the fixed block and pushed against the open end of the U-shape push block.

In a preferred embodiment of the invention, convex parts are provided on the opening side of the middle layer of the housing, so as to fix the inner pot.

In a preferred embodiment of the invention, stop holes are respectively provided on the inner side of the recess areas of both ends of the auxiliary connecting rods corresponding to the two contractible rods, the outer ends of the contractible rods can pass through the stop holes.

In a preferred embodiment of the invention, bumps are respectively provided on top of the inner end of each contractible rod, grooves are provided at the bottom of the button, where the bumps are embedded in the grooves.

In a preferred embodiment of the invention, a lid handle being a hollow housing is provided on the upper side of the lid, the movable fastening mechanism is installed within the inner space of the lid handle; A hole is provided vertically through the top of the lid handle, the button is provided movably inside the hole; Further, two openings corresponding to the two recess areas are provided on the lid handle; The lid handle comprises a first handle case and a second handle case, two compressing plates corresponding to two contractible rods are respectively provided on the first handle case and the second handle case, the two contractible rods are located between the corresponding compressing plates.

In a preferred embodiment of the invention, locating posts and their corresponding locating holes, as well as locating grooves and their corresponding locating strips, are respectively provided on the engaging surfaces of the first handle case and the second handle case.

In a preferred embodiment of the invention, the lid handle is fixed to the upper side of the lid via threaded connection with sealing plugs in the connection sites.

In a preferred embodiment of the invention, a dismountable sealing ring is provided around the lid rim.

Compared with the prior art, the advantages of the present invention are as follows:

I. Owing to the configuration of the lid handle, movable fastening mechanism and the housing handles, it is convenient for users to operate the clamping hooks, so that the lid can be compressed tightly. Moreover, stop holes corresponding to the contractible rods are designed on the movable fastening mechanism, and two compressing plates corresponding to the contractible rods are respectively designed on each handle case. Therefore the contractible rods could be compressed tightly, and the clamping hooks won't be released or misplaced, so that the cooker could be used conveniently.

II. The clamping hook could return to the original released position automatically but not manually via interaction of the fixed block, the push block with the spring in each housing handle.

III. The lid handle is fixed on the lid by screws, and the sealing plugs are provided between the lid handle and the lid in order to strengthen the connection, and therefore the lid can match the lid handle quite well regardless of the irregular surface of the lid.

IV. The inner pot can be compressed more effectively by the lid, since the lid retains the inner pot in a tight compressing situation via two compressing parts, i.e. the free end part and the curve part of the clamping hook. Further, along with the sealing ring on the lid rim, steam and liquid-like food stuffs can be retained in the inner pot, and thus the pressure inside the inner pot rises. This enables the food to be heated evenly, so that the original food nutrients can be retained while consuming less energy.

V. The dismountable sealing ring around the lid rim makes it easy to clean and healthy to use.

VI. The convex parts on the inside wall of the middle layer are provided such that the inner pot could be fixed in a certain place without moving inside the housing.

LIST OF REFERENCE CHARACTERS

111 button;
112 contractible rod;
1121 bump;
1122 slope;
113 spring;
114 auxiliary connecting rod;
1141 wedge;
1142 stop hole;
1143 recess area;
12 lid handle;
121 lid handle case;
12111 locating post;
12112 locating hole;
1212 compressing plate;
1213 end slope;
12141 locating groove;
12142 locating strip;
1215 opening
13 lid;
14 sealing ring;
141 ring grooves;
15 sealing plugs;
2 inner pot;
3 housing;
31 side wall;
311 control knob;
32 base;
321 support leg;
33 middle layer;
331 housing rim;
332 heating element;
4 housing handle;
411 fixed block;
4111 chamber;
4112 slot;
412 U-shaped push block;
413 spring;
414 connecting part;
4141 fixing hole;
42 clamping hook;
421 free end part;
422 curve part;
423 connecting end part;
424 hole
43 housing handle case;
5 convex part.

The invention is described in more details hereunder with reference to the accompanying drawings and exemplary embodiments.

DETAILED DESCRIPTION OF THE INVENTION

Figure 1:
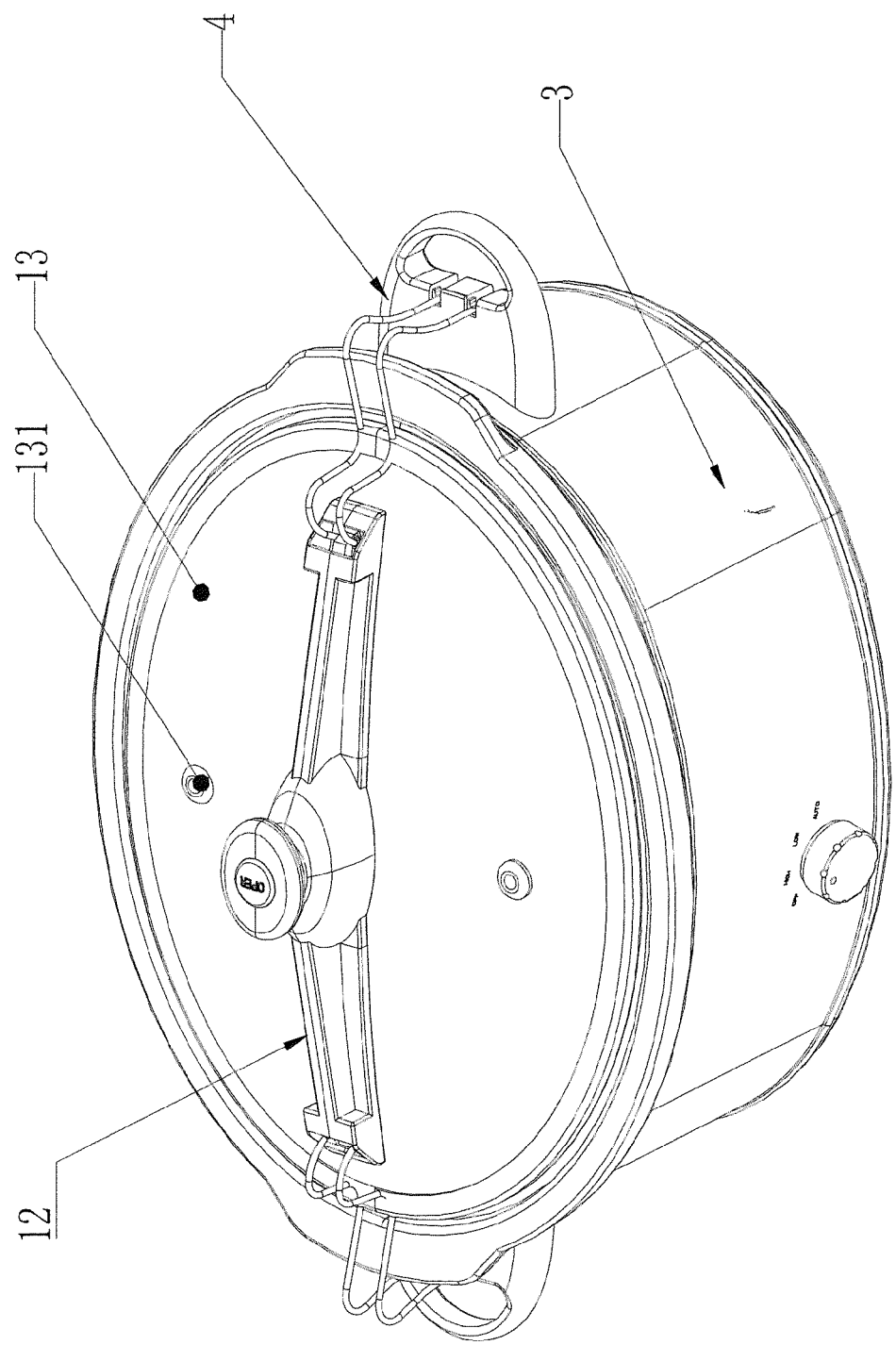
FIG. 1 depicts a schematic drawing of the slow cooker according to the present invention.
Figure 2:
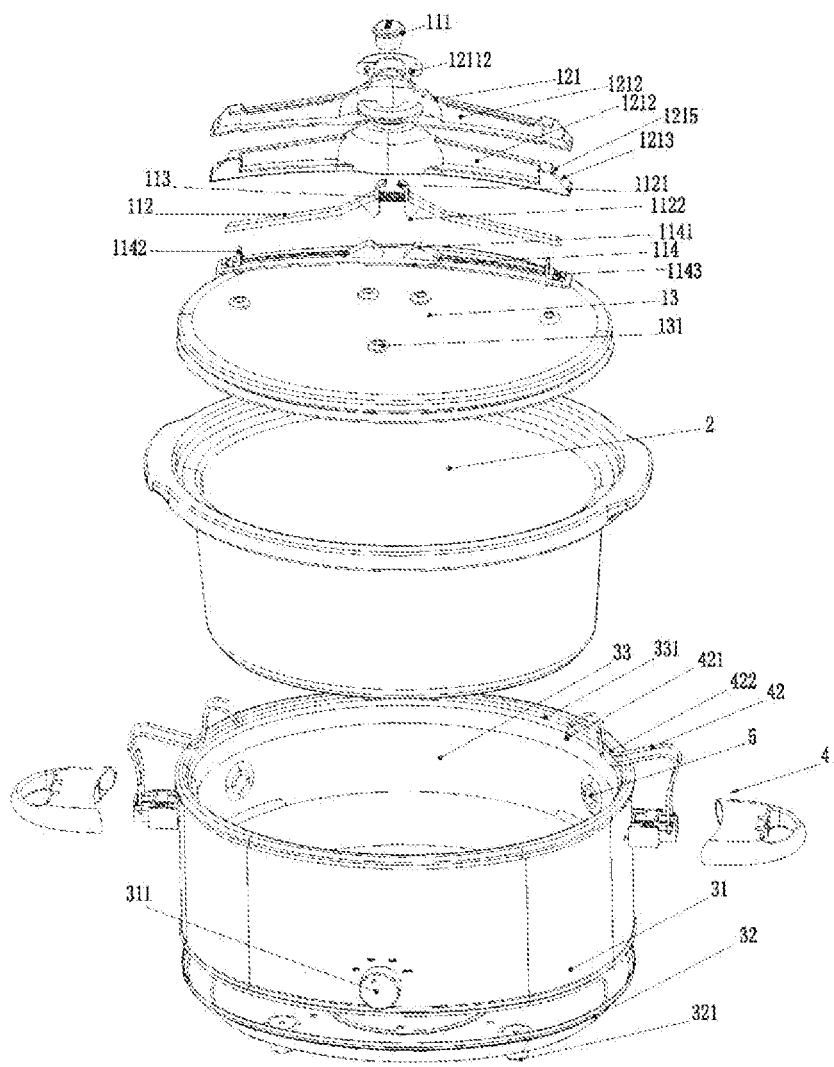
FIG. 2 depicts an exploded perspective view of the slow cooker according to the present invention.

The slow cooker of the invention comprises a housing 3, an inner pot 2, housing handles 4 on the side wall of the housing 3, and a lid 13 as shown in FIG. 1-2.

As shown in FIG. 1-2, the housing 3 is typically oval, circular, or in other shapes, and can be made of metal such as aluminum, stainless steel, or other suitable materials. While metal is preferred for the components of the housing 3, it is within the spirit and scope of the present invention that other materials are applied. The invention is not limited to specific shapes or materials for the slow cooker described above, but it is intended to cover any changes as to the shape and material of the housing that could be made without departing from the spirit and scope of the present invention. The housing 3 comprises a side wall 31, a base 32 and a middle layer 33.

Figure 7:
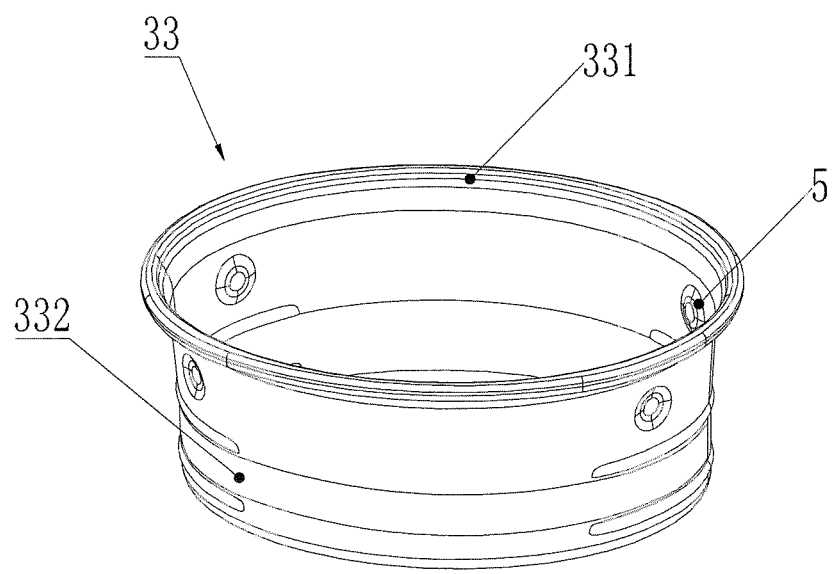
FIG. 7 depicts a schematic drawing of the middle layer of the slow cooker according to the present invention.

As shown in FIGS. 2 and 7, a housing rim 331 is provided on the upper part of the middle layer 33, and extends to the opening rim of the middle layer 33, and is embedded into the side wall 31, the inner pot 2 is surrounded by the middle layer 33. Three separate protrusions or support legs 321 are typically provided on the bottom of the base 32. The support legs 321 can be of various types. The invention is intended to cover all changes as to the support parts that could be made without departing from the spirit and scope of the present invention. However, the bottom can be designed without support legs 321 or protrusions. As shown in FIG. 7, a heating element 332 is disposed within the inner wall of the middle layer 33, which can not be seen from outside. The heating element typically comprises electrical heating parts and insulation parts, such as calrod heating element or mica heating element. The heating element 332 can be installed in other parts of the cooker, such as a portion between the base 32 and the middle layer 33. The invention is intended to cover all changes as to the mounting position and types of the heating element that could be made without departing from the spirit and scope of the present invention.

As shown in FIG. 2, a control knob 311 is typically provided on the side wall 31 in order to allow the user to control the heating element 332. For example, the rotary knob of the control knob 311 is configured at least with a switch, or with a further improved configuration, i.e. "HIGH" and "LOW" function, and even with more developed alternating heating device, such as, but not limit to, rotating the rotary knob to energize the control knob (which cannot be seen from outside), and therefore the heating element 332 will heat the inner pot at the temperature as desired.

As shown in FIG. 2, the inner pot 2 is a hollow container with a rim around the inner pot opening, and its hollow space can be used for containing food. The shape and size of the inner pot 2 are typically in correspondence with that of the middle layer 33, such that the outer wall of inner pot 2 could be close enough to the middle layer 33 in order to receive heat from the heating element 332 of the middle layer 33. The inner pot 2 is usually made of ceramic or stoneware, or other applicable material, such as material with equivalent function like enamel, pottery or aluminum pot. The invention is intended to cover all changes that could be made without departing from the spirit and scope of the present invention. Besides, it is easy to take the inner pot 2 out of the housing 3 and clean it, preventing the housing 3 and the heating element and other energized parts from being inundated by or contacting with detergent.

Figure 5:
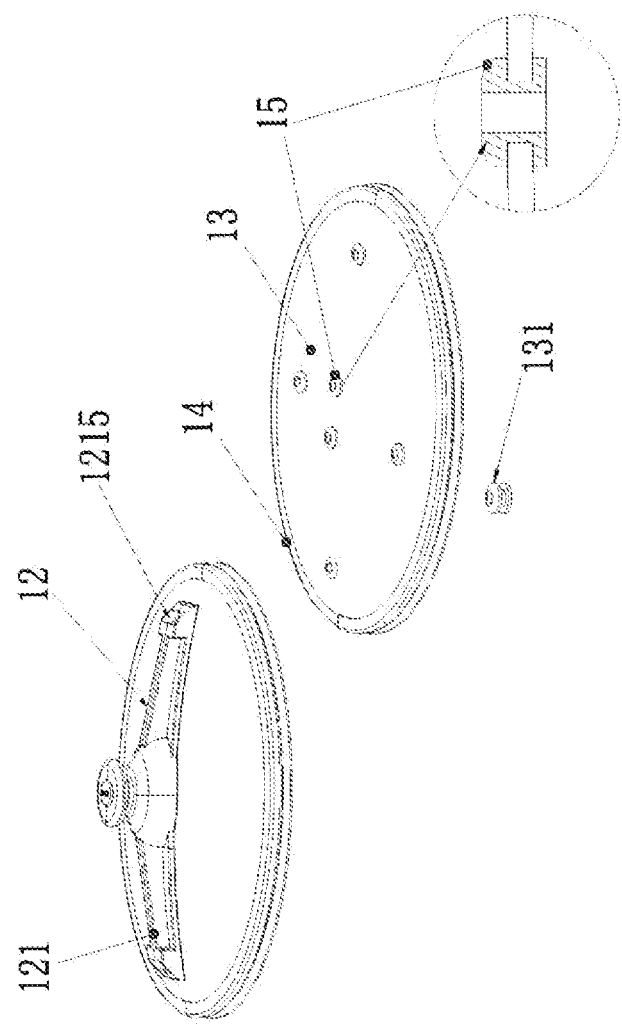
FIG. 5 depicts a schematic drawing of the sealing plug's structure and application according to the present invention.

As shown in FIG. 5, the shape and size of the lid 13 are typically in correspondence with that of the inner pot 2. The lid 13 can generally be placed on the opening part of the upper rim of the inner pot 2 completely or at least partly, so as to cover the inner pot 2. For example, the shape of the lid 13 is oval or circular corresponding to the housing 3, while relevant changes or modifications are within the scope of claims and equivalent technology. The lid 13 is typically made of glass, however it can be made of other transparent of semitransparent materials, such as polymer or other materials with equivalent function, the invention is intended to cover other materials without departing from the spirit and scope of the present invention. Furthermore, at least one vent, generally one or two vents here, is provided on the lid for ventilation, while relevant changes or modifications are within the scope of claims and equivalent technology. A hollow lid handle 12 and a movable fastening mechanism are set on the upper side of the lid 13 as shown in FIG. 2.

As shown in FIGS. 2, 3, 6 and 9, the movable fastening mechanism comprises a first contractible rod 112 and a second contractible rod 112, where a spring is provided between the opposite inner ends of two contractible rods 112; for each contractible rod 112, a slope 1122 inclining towards the inner end of the contractible rod is provided on the bottom of each inner end, and a bump 1121 is provided in the top of each inner end; The contractible rods 112 are typically made of polymers, such as plastics, however other materials with the equivalent functions are also applicable. All materials with the equivalent functions are within the scope of claims and equivalent technology of the present invention; An auxiliary connecting rod 114 is provided under the two contractible rods 112, two wedges 1141 associated with two slopes 1122 respectively are provided in the middle portion of the auxiliary connecting rods 114; Two recess areas 1143 are respectively provided on outer ends of the auxiliary connecting rods, there is no limit to the specific location and depth of the recess area 1143, and those with the equivalent functions are within the scope of claims and equivalent technology of the present invention. Two stop holes 1142 are respectively provided on the inner sides of both recess areas 1143 of the auxiliary connecting rod 114, the outer ends of the contractible rods 112 can pass through the stop holes 1142, thereby the contractible rod 112 is compressed by the stop holes 1142. The outer ends of the contractible rods 112 cover the corresponding recess area 1143. Further, when the contractible rods are pressed down to an utmost position, i.e. the bumps 1121 of the two contractible rods 112 was contacted with each other, the distance between the outer ends of the two contractible rods is not greater than the distance between the two recess areas 1143;

a button 111 is disposed above the contractible rods 112, with a bottom having a groove, two bumps provided on the two contractible rods are embedded in the grooves.

As shown FIGS. 3, 5, 6, 9 and 11, the lid handle 12 is connected to the upper side of the lid 13 by screws, where sealing plugs 15 are provided such that no steam or liquid inside the cooker can leak out, and the lid can match the lid handle quite well regardless of the uneven surface of the lid. The lid handle 12 comprises a first lid handle case 121 and a second lid handle case 121. These two lid handle cases 121 are formed as a whole via a locating post 12111 and a corresponding locating hole 12112 as well as a locating groove 12141 and the corresponding locating strip 12142 on the engaging surfaces of the lid handle cases 121. The lid handle 12 is typically made of polymer, such as plastics, however other materials with the equivalent functions are also applicable. The invention is intended to cover all changes that could be made without departing from the spirit and scope of the present invention and within the claims and equivalent technology scope of the present invention. The movable fastening mechanism is installed inside the lid handle 12. A hole is provided vertically through the top of the lid handle 12. The button 111 is movably provided in the hole. The button 111 is typically made of polymer, such as plastics, however other materials with the equivalent functions are also applicable. The invention is intended to cover all changes that could be made without departing from the spirit and scope of the present invention. Further, two openings 1215 are respectively provided on the end slopes 1213 of the lid handle 12, corresponding to the two recess areas 1143. Two compressing plates 1212 corresponding to two contractible rods 112 are respectively provided on the first and second handle cases 121, and the two contractible rods 112 are provided between the corresponding compressing plates 1212. The compressing plates 1212 and the stop holes 1142 on both ends of the auxiliary connecting rod 114 are used for fastening the contractible rods 112.

As shown in FIGS. 2-4 and 10, the each housing handle 4 comprises a fixed block 411 fixed on the outer wall of the housing 3 and a U-shaped push block 412. Components of the housing handle 4 are typically made of polymer, such as plastics, however other materials with the equivalent functions are also applicable. The invention is intended to cover all changes that could be made without departing from the spirit and scope of the present invention. A chamber 4111 with an upward opening is provided on the fixed block 411, and a slot 4112 is provided on the outer side of the chamber 4111 along the radial direction of the housing 3. The U-shaped push block 412 is provided in the slot and is able to slide horizontally, with a spring 413 provided between its close end and the inner side of the chamber 4111, and its open end projecting from the slot 4112. A connecting part 414 extends from the outer end of the fixed block 411 where the slot is provided. A clamping hook 42 is hinged to the fixed block 414 and push against the open end of the U-shape push block 412. Two compressing parts are provided on each clamping hook 42, one of the compressing parts is the free end part 421 of the clamping hook 42, while the other one is the curve part 422 for clamping the rim of the lid 13. The recess areas 1143 is located in the motion trail of the corresponding free end part 421 of the clamping hook 42. The rim of the lid 13 is fallen into the motion trail of the curve part 422. The clamping hook 42 is made of metal, however other materials are also applicable. The shape of the clamping hook 42 is typically as shown in FIG. 1, but not limit to such material or shape, those with the equivalent functions are within the scope of the present invention. As shown in FIG. 7, the connecting end of the clamping hook 42 to the connecting part 414 is an open end. Two opposite fixing holes 4141 are provided on both side of the connecting part 414 in order to correspond to two ends 423 on the open end of the clamping hook 42 respectively. The two ends 423 on the open end can be driven apart and then inserted into corresponding fixing holes 4141 respectively. With an ability of the clamping hook 42 reversion, the two ends 423 are caught in the fixing holes 4141 of the connecting part 414 tightly. The housing handle 4 further comprises a housing handle case 43 wrapped the fixed block 411 and the U-shaped push block 412.

Preferably, springs will be the elements which retract and extent in the movable fastening mechanism and housing handles, but other elastic elements with different sizes and materials but equivalent functions are also applicable. The invention is intended to cover all changes that could be made without departing from the spirit and scope of the present invention.

As shown in FIGS. 2 and 7, convex parts 5 are provided on the opening side of the middle layer 33 of the housing 3, so as to fix the inner pot 2 and prevent the inner pot 2 from moving inside the housing 3. There are typically, but not limit to, four convex parts provided. The invention is intended to cover all changes as to the number of the convex parts that could be made without departing from the spirit and scope of the present invention.

Figure 6:
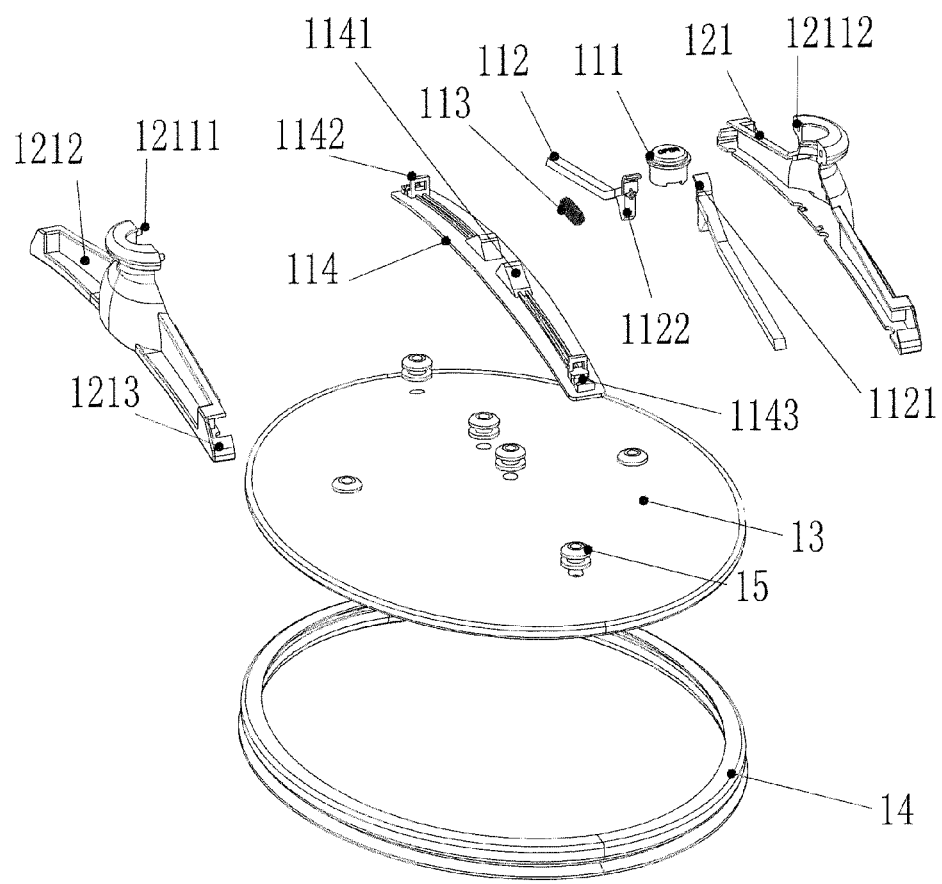
FIG. 6 depicts a structural schematic drawing of the handle and movable fastening mechanism according to the present invention.
Figure 8:
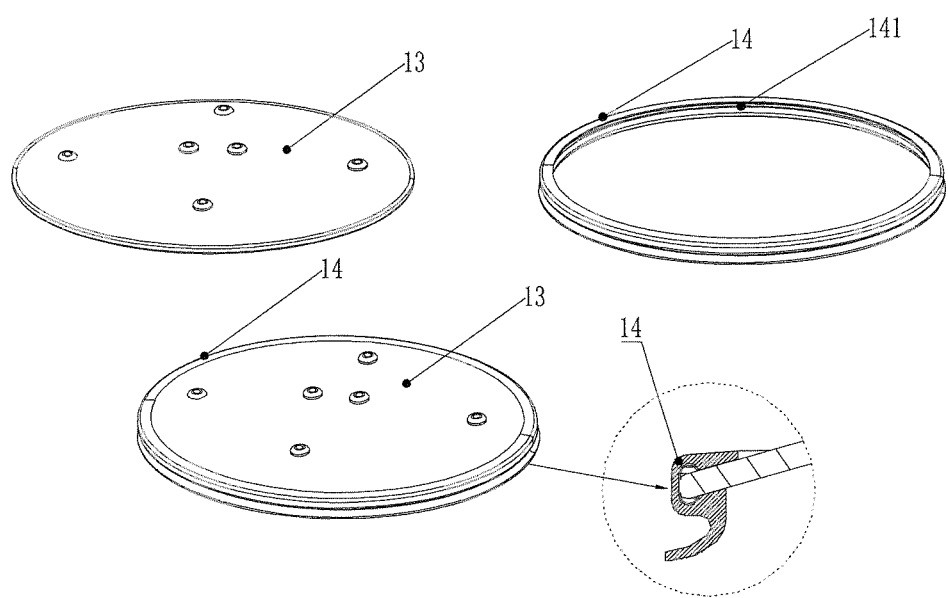
FIG. 8 depicts a schematic drawing of the lid and the sealing ring according to the present invention.

As shown in FIGS. 5, 6 and 8, a sealing ring 14 is provided around the rim of the lid 13. The sealing ring 14 is typically made of silica gel, however other materials with equivalent functions are also applicable. The shape of the sealing ring 14 is oval, and its cross section view is shown in FIG. 8. The invention is intended to cover all changes as to the material and shape of the sealing ring that could be made without departing from the spirit and scope of the present invention. The sealing ring 14 is a closed ring, with a ring groove 141 provided corresponding to the rim of the lid 13 in the inner side of the sealing ring 14. With the elasticity of the sealing ring 14, the rim of the lid 13 can be surrounded completely and tightly by the sealing ring 14 by matching the ring groove 141 of the sealing ring 14 with the rim of the lid 13. The sealing ring 14 can seal up the cooker, in order to prevent the steam and liquid food from flowing out, and thus the pressure inside the cooker rises, which brings better uniform heating, more nutrition, but less electrical power. Further, it is a healthy way that the sealing ring 14 can preferably be dismantled and cleaned alone.

Figure 3:
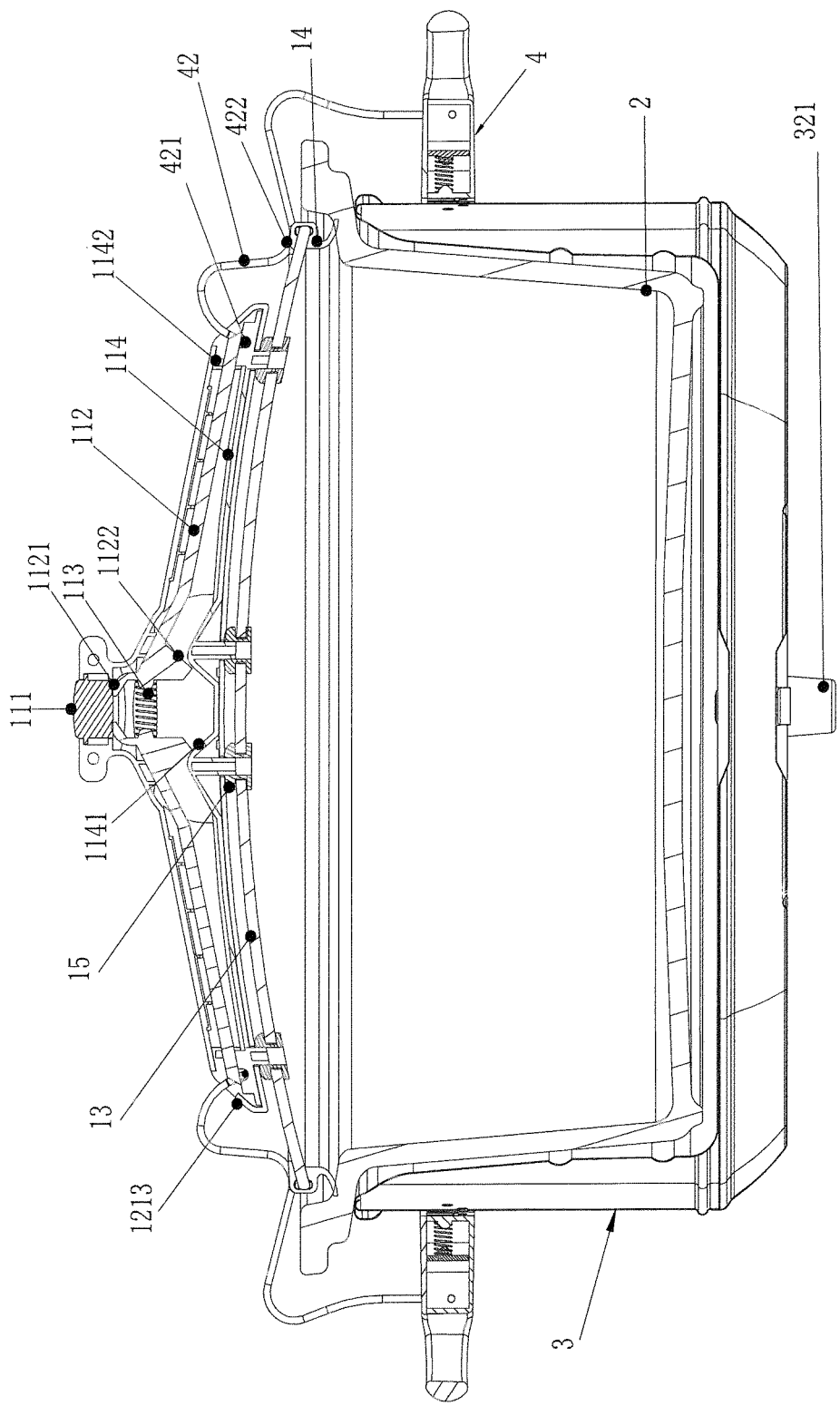
FIG. 3 depicts a cross-sectional view of the slow cooker according to the present invention.
Figure 4:
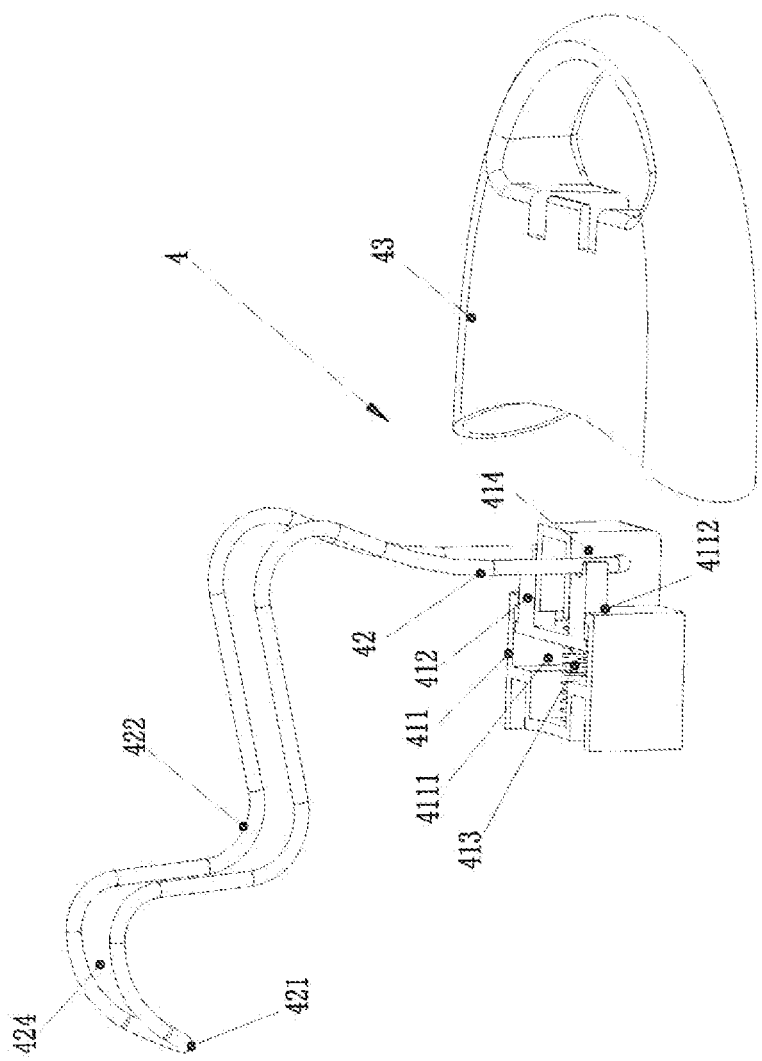
FIG. 4 depicts a schematic drawing of the handle according to the present invention.
Figure 9:
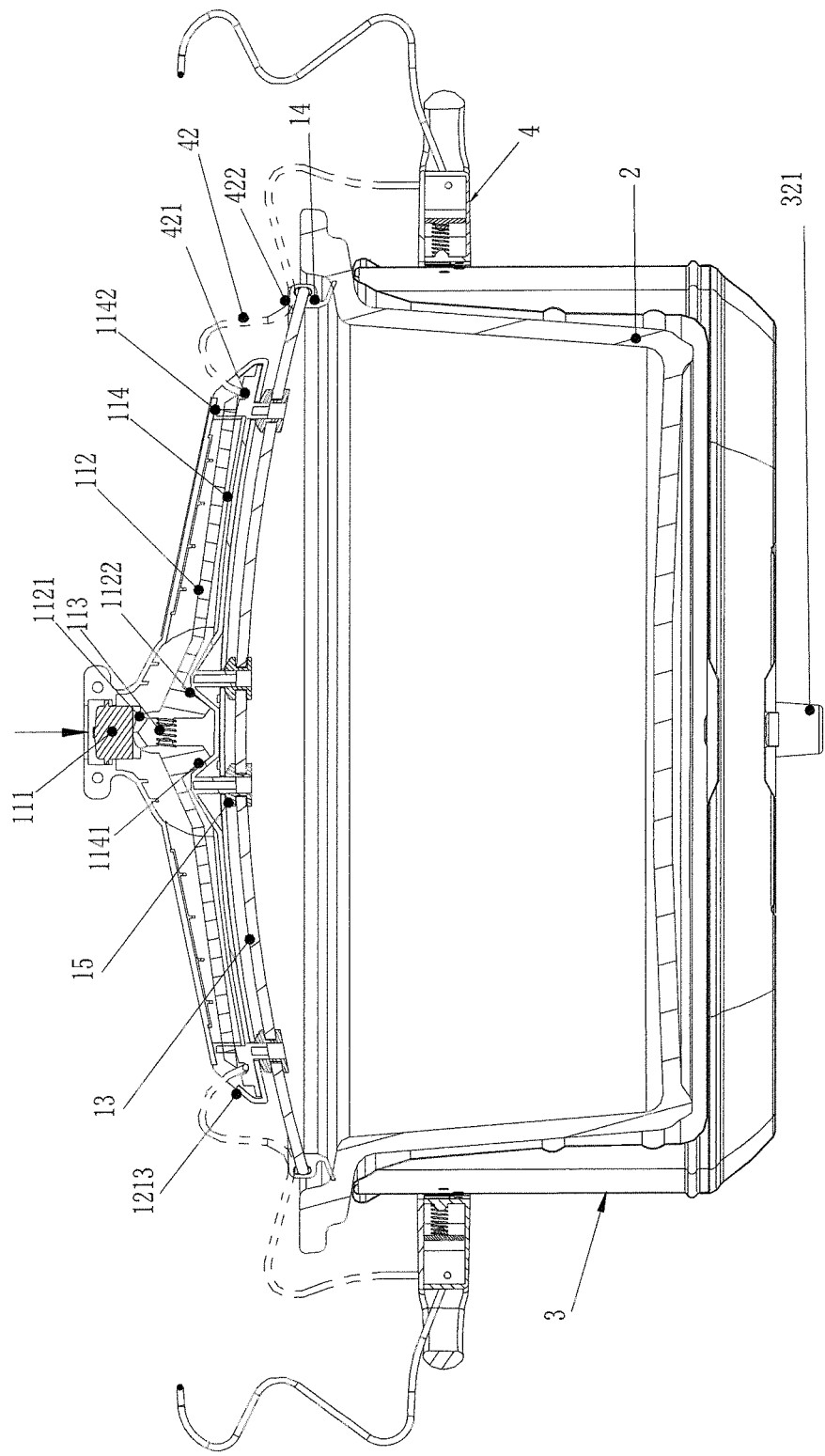
FIG. 9 depicts a demonstrating drawing of the movable fastening mechanism according to the present invention.
Figure 10:
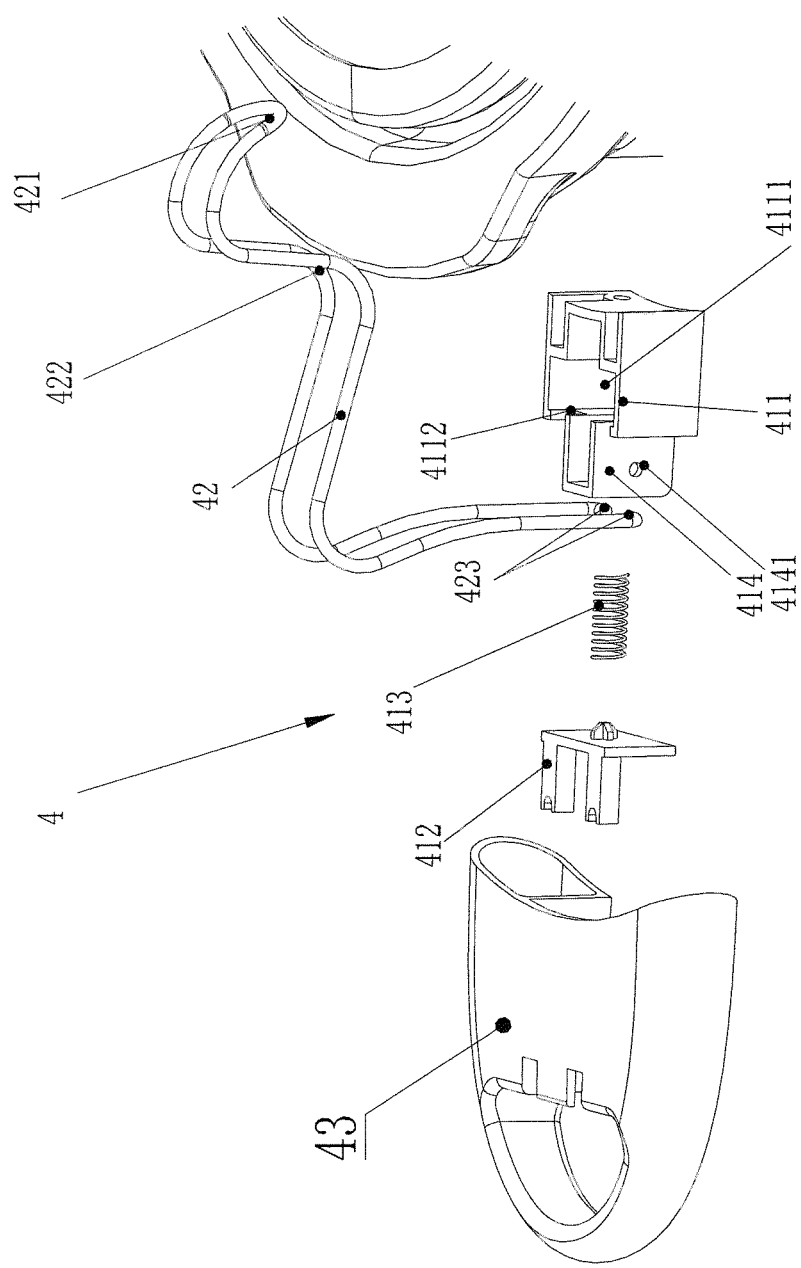
FIG. 10 depicts an exploded view of the handle according to the present invention.
Figure 11:
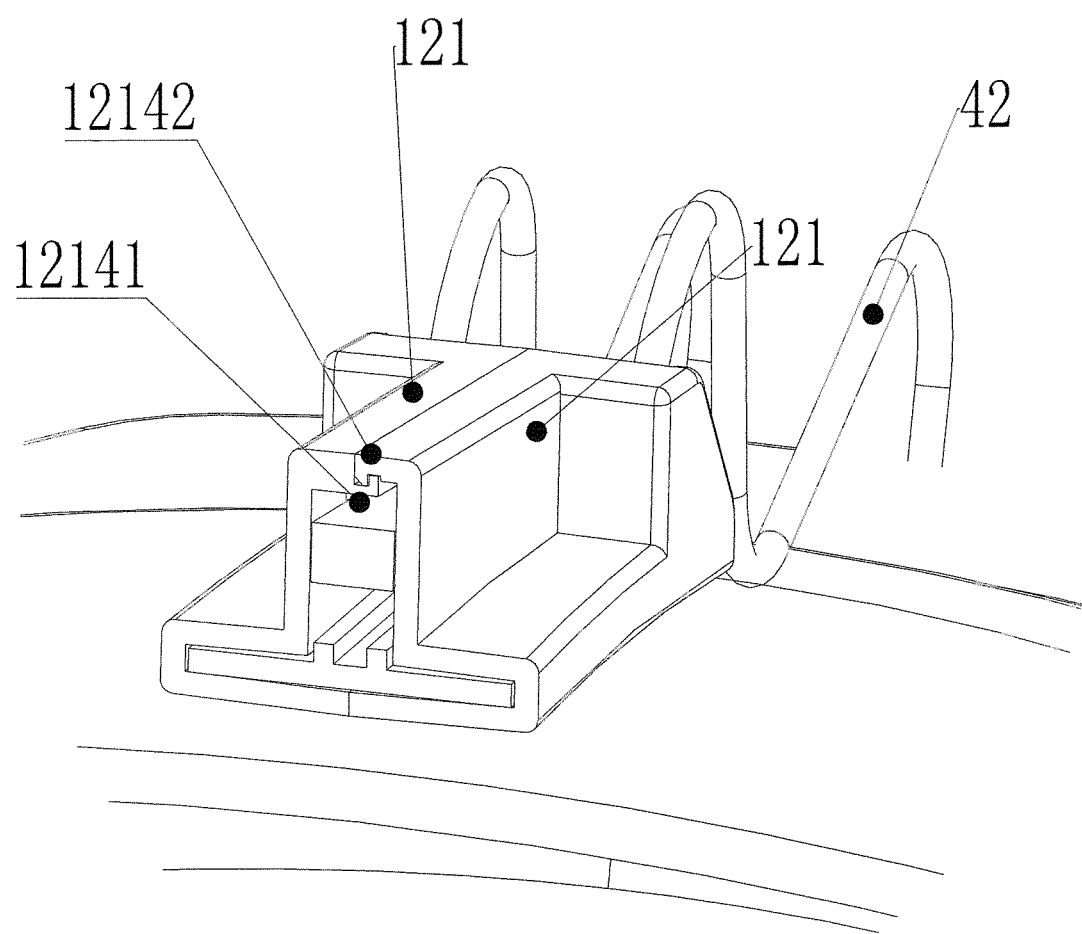
FIG. 11 depicts a schematic drawing of the locating groove and locating strip on the housing according to the present invention.

As shown in FIGS. 3 and 9, when in use, the housing 3 is covered with the lid 13, and then the free end parts 421 of the clamping hooks 42 are pushed through the hole in the end slope 1213 of the contractible rods 112, and then the bumps 1121 and the slopes 1122, of the two contractible rods 112, slide and retract inward along the wedges 1141 of the auxiliary connecting rod 114. Once the free ends 421 of the clamping hooks 42 are locked in the recess areas 1143, the two contractible rods 112 extend respectively under the reversion of the spring 113, and the outer ends of the two contractible rods 112 will cover the recess areas 1143 and pass through the clamping hook 42 respectively. As a result, the lid 13 is compressed tightly by the clamping hook 42, while the inner pot 2 is compressed tightly by the lid 13, and the rim of the lid 13 is compressed tightly by the curve parts 422 of the clamping hooks 42. When the user wants to open the lid 13, he can push the button 111, such that the two contractible rods 112 can retract inward respectively with slopes along the wedges 1141, and then the outer ends of the two contractible rods 112 will not cover the recess areas any more. Meanwhile, the springs 413 in the housing handles 4, under its reversion action, push the U-shaped push blocks 412 to act on the clamping hooks 42, therefore the clamping hooks 42 are released automatically from the recess areas 1143, and the lid 13 can be removed easily.

It should be understood, the present invention is not limited to the embodiments described above. The invention is intended to cover various changes or modifications that could be made without departing from the spirit and scope of the present invention.

What is claimed is:

1. A slow cooker with a fastening mechanism, comprising a housing, housing handles on an outer wall of the housing, and a lid, wherein a movable fastening mechanism is provided on an upper side of the lid, the movable fastening mechanism comprises:
    a first contractible rod and a second contractible rod, where a spring is provided between the two contractible rods, two slopes inclining towards each inner end of the contractible rods being provided on a bottom of the inner end of each contractible rod;
    an auxiliary connecting rod provided under the two contractible rods and fixed on the lid, where two wedges corresponding to the slopes respectively are provided in a middle of the auxiliary connecting rod, and two recess areas are also respectively provided on two ends of the auxiliary connecting rod, and the outer ends of the two contractible rods cover the corresponding recess areas; and
    a button provided above the contractible rods, with its bottom contacting with the top of the inner ends of the two contractible rods; wherein when the contractible rods are pressed down by the button to an utmost position, the horizontal distance between the outer ends of the two contractible rods is not greater than the horizontal distance between the two recess areas;
    a clamping hook is hinged to each handle and corresponds to the movable fastening mechanism, wherein the two recess areas are located in a motion trail of a free end part of a corresponding clamping hook, a hole is provided on the free end part and corresponds to the outer end of each contractible rod.

2. The slow cooker of claim 1, further comprising two compressing parts provided on each clamping hook, one of the two compressing parts is the free end part of the clamping hook, while the other of the two compressing parts is the curve part for clamping a lid rim, the lid rim being located in a motion trail of the curve part.

3. The slow cooker of claim 1, wherein each of the housing handles comprises a fixed block fixed on the outer wall of the housing and a U-shaped push block, a chamber with an upwards opening is provided on the fixed block, and a slot is provided on the outer side of the chamber along the radial direction of the housing, the U-shaped push block is provided in the slot and is able to slide horizontally, with a spring provided between its closed end and the inner side of the chamber, with its open end projecting from the slot, the clamping hook is hinged to the fixed block to push against the open end of the U-shaped push block.

4. The slow cooker of claim 1, further comprising convex parts provided on the opening side of a middle layer of the housing so as to fix an inner pot.

5. The slow cooker of claim 1, further comprising stop holes respectively provided on the inner side of the recess areas of both ends of the auxiliary connecting rod corresponding to the contractible rods, the outer ends of the contractible rod can pass through the stop holes.

6. The slow cooker of claim 1, further comprising bumps respectively provided on top of the inner end of each contractible rod, grooves provided at the bottom of the button, and bumps embedded in the grooves.

7. The slow cooker of claim 1, further comprising a lid handle being a hollow housing provided on the upper side of the lid, the movable fastening mechanism is installed within the inner space of the lid handle, and a hole is provided vertically through the top of the lid handle, the button is provided movably inside the hole, and two openings corresponding to the two recess areas are provided on the lid handle, the lid handle comprises a first handle case and a second handle case, two compressing plates corresponding to two contractible rods being respectively provided on the first handle case and the second handle case, the two contractible rods being located between the corresponding compressing plates.

8. The slow cooker of claim 7, wherein locating posts and their corresponding locating holes, as well as locating grooves and their corresponding location strips, are respectively provided on engaging surfaces of the first handle case and the second handle case.

9. The slow cooker of claim 7, wherein the lid handle is fixed to the upper side of the lid via a threaded connection with sealing plugs in connection sites.

10. The slow cooker of claim 2, further comprising a dismountable sealing ring provided around the lid rim.

11. The slow cooker of claim 2, wherein each of the housing handles comprises a fixed block fixed on the outer wall of the housing and a U-shaped push block, a chamber with an upwards opening is provided on the fixed block, and a slot is provided on the outer side of the chamber along the radial direction of the housing, the U-shaped push block is provided in the slot and is able to slide horizontally, with a spring provided between its closed end and the inner side of the chamber, with its open end projecting from the slot, the clamping hook is hinged to the fixed block and push against the open end of the U-shape push block.

* * * * *